May 18, 1954    E. H. SIMPSON ET AL    2,678,450
EXCRETA DISPOSING TOILET
Filed Oct. 13, 1950    3 Sheets-Sheet 1

EDWARD H. SIMPSON
GORDON DECKMAN
INVENTOR.

BY

ATTORNEY.

May 18, 1954  E. H. SIMPSON ET AL  2,678,450
EXCRETA DISPOSING TOILET

Filed Oct. 13, 1950  3 Sheets-Sheet 2

EDWARD H. SIMPSON
GORDON DECKMAN
INVENTOR.

BY

ATTORNEY.

May 18, 1954  E. H. SIMPSON ET AL  2,678,450
EXCRETA DISPOSING TOILET
Filed Oct. 13, 1950  3 Sheets-Sheet 3
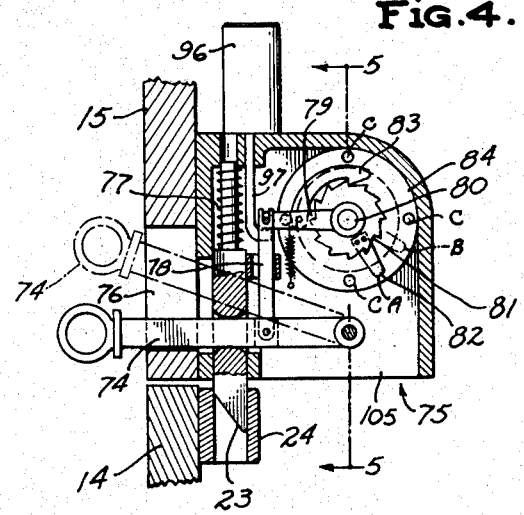
Fig.4.
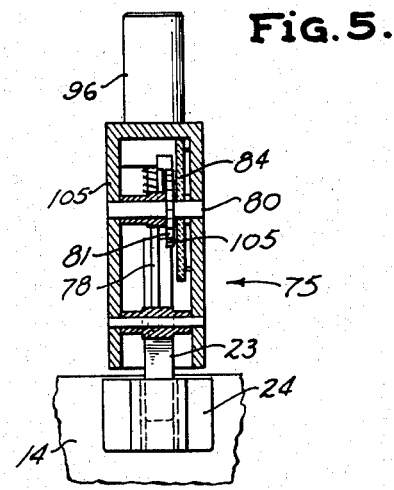
Fig.5.
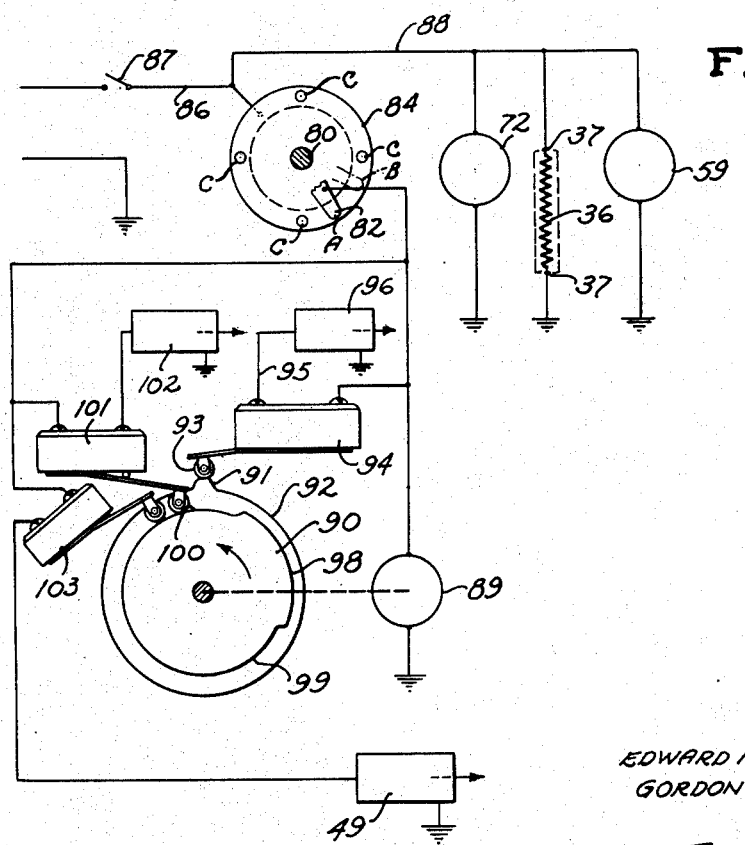
EDWARD H. SIMPSON
GORDON DECKMAN
INVENTOR.
BY
ATTORNEY.

Patented May 18, 1954

2,678,450

UNITED STATES PATENT OFFICE 2,678,450

EXCRETA DISPOSING TOILET

Edward H. Simpson and Gordon Deckman, Los Angeles, Calif., assignors to O & M Machine Company, Inc., Los Angeles, Calif., a corporation of California Application October 13, 1950, Serial No. 190,020

6 Claims. (Cl. 4—10)

This invention relates to a waste disposal apparatus. It relates particularly to a disposal toilet for waste of the human body, for installations under conditions such that no sewer connection is available. Such is always the case with moving vehicles. A sewer connection may also be unavailable or impracticable in stationary buildings in temporary or permanent locations and the invention is suitable for such installations if permitted by the local sanitary and housing regulations.

The problem posed by the disposal of body waste on moving vehicles has not been satisfactorily solved. The problem has probably been least troublesome on railroad trains, since the toilet rooms can be locked in populous areas and the waste can be discharged on the railroad's own right of way from fast moving trains with little objectionable result. The difficulty of the problem is greater in the case of busses and house trailers traveling over public rights of way, and reaches its greatest magnitude in aircraft. Discharge over land areas at low altitudes is obviously undesirable, and even in the case of discharge over bodies of water or at high altitudes over land, the relative wind velocity of the aircraft and surrounding air of the slip stream is great enough to make the projection of waste matter away from and apart from contact with the surface of the craft impossible without the use of devices which will create a serious drag.

One object of the invention is to provide a body waste disposal apparatus which will convert the waste matter into such form that it may be discharged promptly and without intermediate storage into the open air whether from a moving vehicle or stationary building, without any objectionable result.

A special object of the invention is the provision of a body waste disposal apparatus for use with toilets on aircraft which will not be harmfully affected by surrounding atmospheric conditions, or by the pressure differential between the interior of the aircraft and the outside air.

It is another object of the invention to provide a body waste treatment apparatus which shall receive the waste from the toilet bowl and at once convert the waste liquid and flush water to vapor and steam, and reduce the waste solid into gases and a finely comminuted ash residue of minimum mass and which shall, after conversion and reduction discharge the steam, gas and ash dust into the surrounding atmosphere in a sanitary state and with the least possible amount of solid matter, and with that small amount in a finely divided, easily dissipated form.

Other objects and advantages of the invention will be appreciated as the following description of one embodiment of it is read in conjunction with the drawings, of which:

Figure 4 is a vertical sectional view of the electrically actuated control device for the toilet seat lock;

Figure 5 is a vertical sectional view of the same control device taken along the line 5—5 of Figure 4; and Figure 6 is a diagrammatic representation of the electrical control circuits by which is effected the sequential operation of the moving parts of the apparatus of the invention for the automatic performance of its function.

The invention is herein described in connection with an aircraft, but may be used with any other type of moving vehicle, or may be installed in a stationary structure. The invention consists of three principal parts, the toilet 11, or as it may be more generically termed, the waste receiver, the incinerator 12, or waste converter, and the blower 13, or waste dissipator.

The toilet may be of different kinds and yet function satisfactorily with the incinerator and blower. The details of construction of the toilet are not the subject matter of the invention presented and claimed in this application. The toilet or waste receiver described and shown herein, is of the disappearing type, which is preferable but not necessary. It is also preferable but not necessary that the toilet be designed for the use of minimum charges of flush water. Insofar as the mechanical and electrical devices for the control of the operation of the invention are a part of the invention, the structural features of the toilet will affect the details of the arrangement of these control devices. Except as it affects, then, the control of the operation of the incinerator and blower, the toilet structure is not a part of the invention claimed in this application. The incinerator and blower may even be operated independently of any toilet, the waste to be disposed being deposited by some other means or in some other manner in the incinerator.

Figure 1:
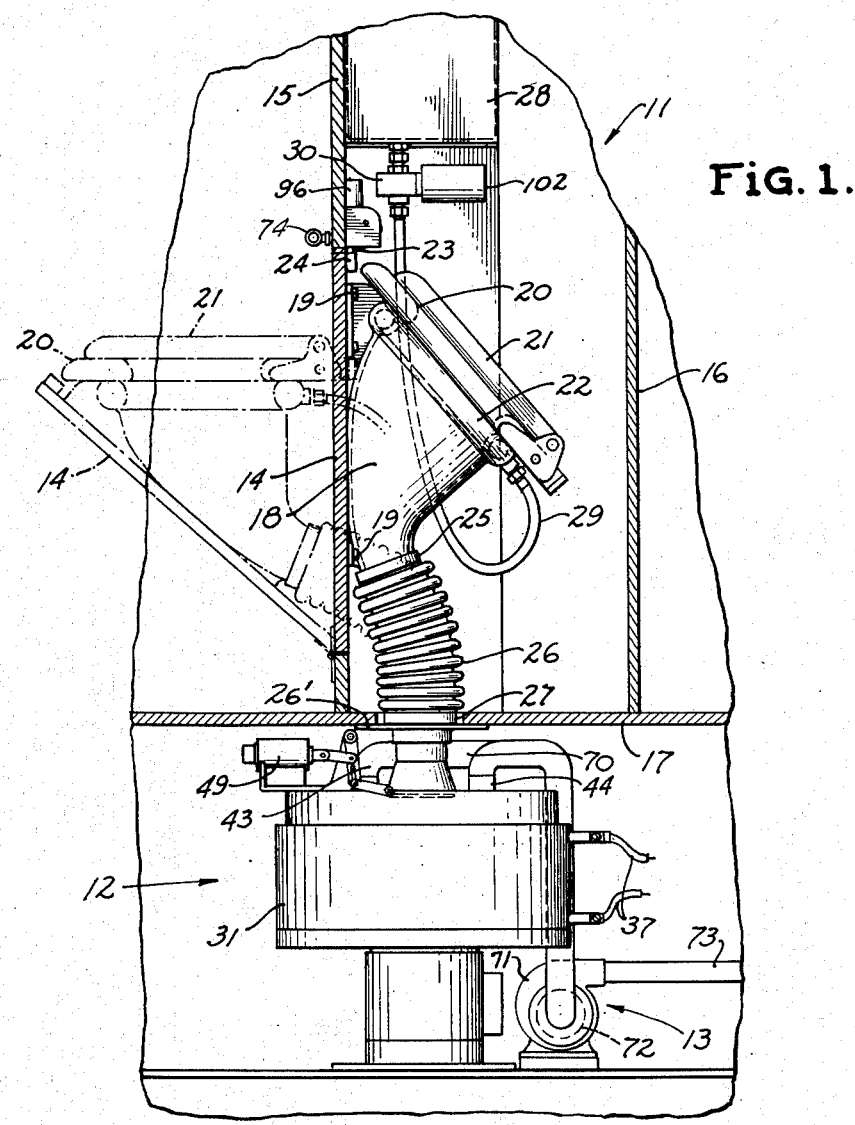
Figure 1 is a side elevational view of a disappearing waste receiving toilet and the waste disposal apparatus associated therewith, the frame structure of the vehicle or building in which it is installed being shown in section.
Figure 3:
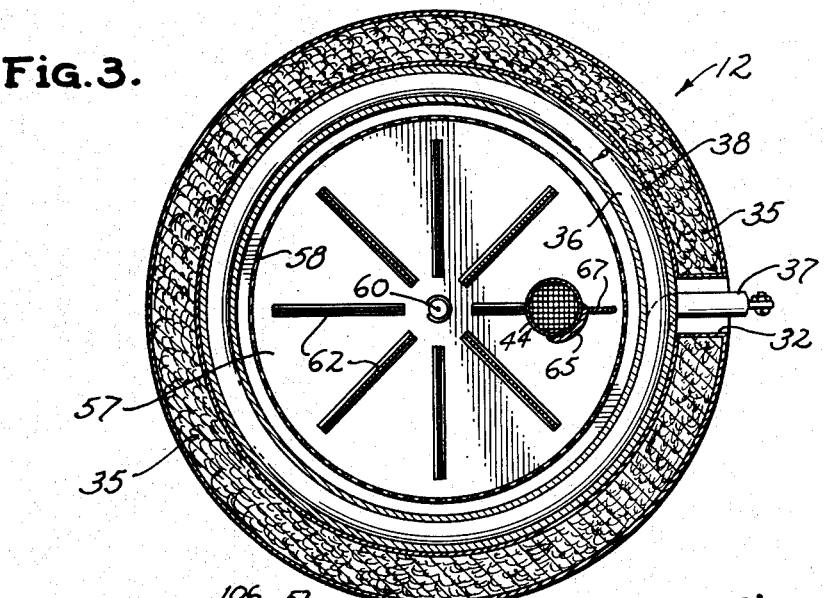
Figure 3 is a horizontal section of the incinerator taken along the line 3—3 of Figure 2.

The toilet or waste receiver 11 is of the retractable concealed type. It is shown in Figure 1 in full lines in the retracted position behind a hinged section 14 of the wall 15, which with the rear wall 16, vehicle or building floor 17 and suitable side walls, form a permanent enclosed cabinet for the toilet. The toilet bowl 18 is permanently secured to the hinged wall section 14 by fastening bolts 19. It has the usual hinged seat 20, hinged seat cover 21, and perforated flush ring 22. The hinged wall section 14 with the bowl attached, is held in the retracted position by a vertically movable latch 23 which engages a latch holder 24 secured to the outer end of the wall section. The discharge end 25 of the bowl 18 is connected in air-tight fashion to a bellows type flexible fitting 26 which is secured to an apertured plate 26' fastened across the opening 27 in the floor 17.

The flush ring 22 is supplied with water from the flush tank 28 through a flexible hose length 29. The flow of flushing water is regulated by a solenoid operated valve 30 in a manner to be later presented. The operation of opening and closing the toilet will be more fully considered when considering the operative cycle of the invention.

The incinerator is housed within a chambered cylindrical container 31. The container 31 comprises a cup-shaped metal casting formed with a cylindrical side wall 33 and a bottom wall 34, and having a metal cover 39 closing the upper open end of the casting. Thermal insulating packs 35a, 35b, 35c overlie the side wall 33, cover 39 and bottom wall 34, respectively, to minimize heat loss. The cylindrical side wall 33 has imbedded therein an electric spirally arranged heating coil 36, the terminals 37 of which are connected, as will later appear, to a source of electric current. Heating coils may also be built into the bottom wall 34 of the container if desired. The flow of current to the heating coil is controlled by a thermostat (not shown) to limit the maximum temperature of the incinerator to a constant value. The construction of the container can be varied in its details, the arrangement shown being illustrative only.

The cover 39 has three openings, a central opening 40, and two openings 41 and 42 for the vent pipe 43 and discharge tube 44, respectively. The bellows fitting 26 has an air-tight connection at its lower end with a short pipe length 45, which is seated at its lower end within the central opening 40 of the cover 39. A trap door 46 is hinged at 47 in the side of the pipe 45 and swings downwardly away from, and upwardly toward, a circular flange 48 formed on the inner wall of the pipe 45 against which it is normally held in sealed relationship by a spring 106. This trap door is moved downward by a solenoid 49, of which the armature, when it moves outward, pushes a spring retracted lever 50 by means of the link 51 in an arc about its pivot 52. The arm 53 integrally connected to the trap door, swings upwardly, due to the sliding engagement of its pin 54 with the slot 55 in the lower end of lever 50. The conditions and means of energizing the solenoid 49 will be explained below.

The difficulty in sanitary disposal of waste from the human body in any other way than discharge into a sewer main, is due to its solid and liquid condition. Assume that it can be successfully converted almost completely to gaseous products, and that the extremely small ash residue which remains solid and chemically inert after being subjected to high combustion temperatures in the presence of oxygen, can be finely comminuted. The entire mass of the waste matter can then be blown into the atmosphere or into an ash collector without danger to health, and without offending the sense of sight or even the sense of smell excepting possibly at points close to the discharge opening. The incinerator and blower of this invention are designed for this process of conversion and dissipation of the waste matter.

Figure 2:
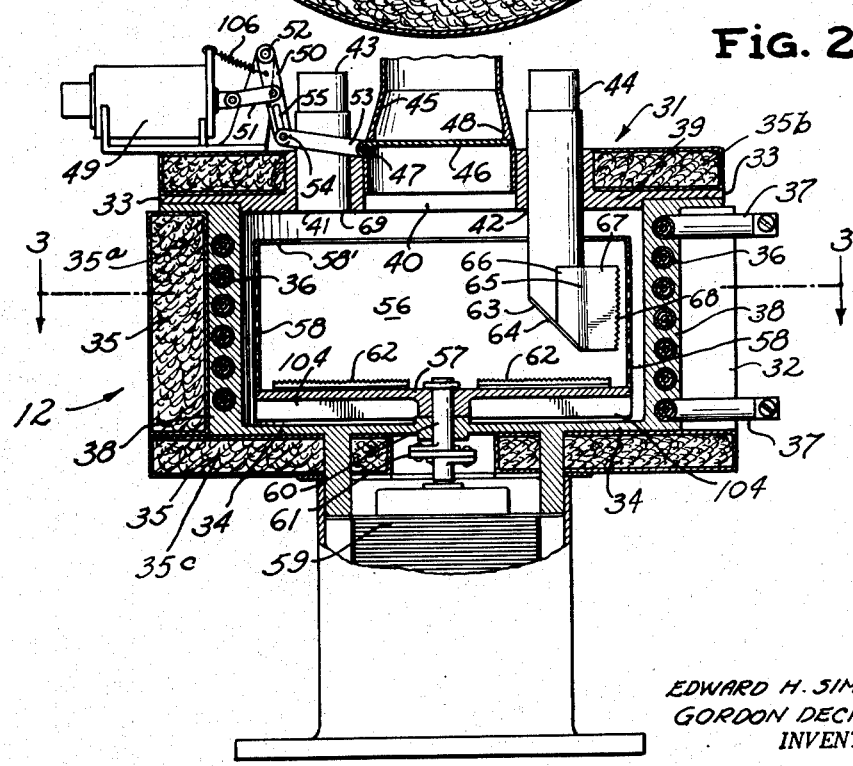
Figure 2 is a vertical sectional view of the waste incinerator.

To effect the conversion, a novel device is employed. Within the container chamber, an open topped basket 56 (see Figure 2) is mounted to rotate on a vertical axis centrally of the container chamber. The basket has a bottom plate 57 and integral therewith a cylindrical side wall 58 spaced close to the casting wall 38. The side wall 58 has a large number of perforations of relatively small diameter. The diameter and spacing of the perforations may vary under different conditions, with the dimensions of the basket, and with the rated speed of rotation of the basket.

The basket has a narrow preferably integral annular flange 58' at its upper rim. The bottom plate 57 is fixedly secured to a shaft 60 revolvably mounted in the bottom plate 34 of the container. A motor 59 is mounted coaxially below the shaft 60, and its shaft is flexibly coupled thereto by a heat insulating disk 61. The bottom plate 57 carries a plurality of upstanding fins 62, serrated on their upper edges. The discharge tube 44 extends well into the basket 56 and terminates in an opening 63, which lies in a plane at an angle of 45 degrees or other substantial angle to the horizontal. This opening is screened at 64 so as to admit to the tube 44 only solid particles of very small size.

A bracket 65 has a rounded base 66 by which it is fastened to the discharge tube 44, and a pulverizing wiper flange 67 projecting radially outwardly from the tube toward the perforated wall 58, and to a vertical terminal serrated edge 68 which lies close to the inner surface of the wall 58.

The vent pipe 43 has its inlet terminal 69 approximately at the level of the underface of the cover 39. It discharges into the discharge tube 44 at 70. The discharge tube 44 continues on from the junction 70 to a blower 71 operated by a motor 72. The blower exhausts into a discharge pipe 73 which leads to a suitably disposed outlet (not shown).

The operational sequence of the disposal apparatus may be varied somewhat, according to the conditions of the installation. The control devices herein shown and which will now be described, effect a sequence which is well adapted to the invention as applied to aircraft. In the course of the description, some of the possible variations from this sequence will be noted, adapted either to aircraft installations, to installations on other types of vehicles, or to stationary structures.

Referring to Figure 4, when the toilet 11 is to be used, a lever 74 hinged to a small housing 75 on the inner face of the cabinet wall 15 is grasped at its outer end which projects through a slot 76 in the wall 15, and elevated to the dotted line position shown in Figure 4 against the pressure of the spring 77. This raises the plunger latch 23 to a level at which its lower end clears the latch holder 24, freeing the wall section and toilet for outward movement. The toilet may be designed so that this movement is brought about by gravity, or by a suitably arranged spring (not shown). The latch lever 74 is then dropped under the action of the spring 77 to its initial position.

Upon elevating the latch lever 74, a lifting link 78 swings upwardly a spring biased arm 79 which is pivotally secured at its inner end on a pin 80. This pin stationarily spans the side walls 105 of the housing 75. A notched disk 81 carrying a contact arm 82 is also loosely mounted on this pin 80. A spring biased pawl 83 pivoted to the arm 79 intermediate its ends, rides over one of the ratchet teeth of the disk 81 on upward movement of the arm 79, and turns the ratchet wheel the angular distance between adjacent ratchet teeth upon downward movement of the arm 79. As there are twelve ratchet teeth, the contact arm 82 is thereby moved one-twelfth of a full revolution in a counterclockwise direction.

A stationary multiple contact disk 84 of non-conducting material is also carried by the pin 80. It has four contact buttons C equally spaced about its periphery. As shown in Figure 6, these contact buttons C are permanently electrically connected to a current source by the conductor 86, in which is interposed master switch 87 under the manual control of the aircraft pilot or other operator of the disposal apparatus.

Initially the contact arm 82 is in position A or one of the other four similar electrically dead positions around the disk 84. When the toilet is opened for use, the ratchet wheel turns the arm 82 to position B, which is another dead position. When the toilet is manually returned to its concealed or closed position, the ratchet wheel turns the arm to the live contact position C.

Referring now to Figure 6, it is apparent that when the master switch 87 is closed current will flow over conductor 88 to the heating elements 36, the basket motor 59 and the blower motor 72. Thus the basket and blower and heating elements will be in operation whenever this switch is closed. The pilot may thus energize these three elements of the disposal apparatus when the aircraft flight begins and de-energize them at the end of the flight. This arrangement provides that the incinerating and dissipating parts of the apparatus shall be always in operative readiness for the reception of waste matter, and shortens the time required for incinerating any given mass of waste matter over that required when standby heating is not provided for, the thermostat in each case being set for the same temperature.

When now, upon retracting the toilet, the contact arm 82 is turned to position C, a control motor 89 will, through suitable reduction gearing, rotate a master control wheel 90, turning it in a counterclockwise direction from its initial position shown in full lines in Figure 6. In the initial position a cam 91 on its outer rim 92 will permit the radially inward movement of a cam follower 93, which will close the normally open microswitch 94 and permit the flow of current over the conductor 95 to a solenoid 96. This solenoid (see Figure 4) will pull upward a hooked extension 97, elevating the arm 79 from its lost motion connection with link 78, and cause the ratchet pawl to move and drop into engagement with the next pawl, and maintain that position until the microswitch is again de-energized at the completion of one rotation of the master control wheel 90. At the latter juncture, the solenoid coil 96 will drop and turn the arm 82 to the next following dead position B, in which the entire apparatus is set for the next operative cycle upon the next use of the toilet.

Reverting to the rotation of the master control wheel, an elongated cam surface 98 on a second inner rim 99 of the wheel will, when its leading end lifts the cam follower 100, close a normally open microswitch 101 to operate a spring biased solenoid 102 (see Figure 1) which opens the flush valve 30. Flush water flows into the flush ring, and thence into the bowl, and collects with the waste matter on top of the trap door 46. When the trailing end of the cam 98 again closes the microswitch 101, the de-energized, spring biased solenoid 102 closes the valve 30, and the flushing stream is turned off. When the cam surface 98 similarly operates the normally open microswitch 103, the solenoid 49 opens the trap door 46 shortly after the flush water is turned on and later closes the trap door 46 shortly after the flush water is turned off. The opening of the trap door dumps the accumulated waste matter and flush water into the incinerator basket 56. Closing of the trap door prevents escape of obnoxious odors from the incinerator into the toilet bowl and interior of the aircraft.

The waste and water is received by the whirling basket. The materials are thrown against the perforated basket walls. The liquid passes through the perforations and is evaporated by the inner surfaces of the hot side walls 38 of the container. Any liquid which falls to the bottom of the annular space between the walls 38 and the basket walls and enters the clearance space between the bottom plate 57 of the basket and the bottom plate 34 of the container is thrown back against the side walls 38 by radial vanes 104 formed on the under surface of the bottom plate 57 of the basket. The fins 62 tend to break up the solid particles of waste matter as they are hurled outwardly against the basket walls. Centrifugal force holds the solid matter against the inner surface of the basket walls, and this solid matter tends to slowly climb the side walls. If it should reach the flange 58' it will be trapped and dropped to the bottom of the basket. Before reaching the flange 58', however, the bulk of the solid particles will be finely comminuted by contact with the serrated edge of the wiper flange 67. Excess solid waste matter will be caught by the stationary flange 67 and dropped back to the bottom of the basket from which it will again be thrown against the basket walls and further dried and subdivided as it is rapidly whirled within the basket and tends to again climb the basket walls. And while the solid matter is thus thrown around and broken into finer and still finer particles, the intense heat of the chamber within the basket and container will incinerate the solid portion of the waste matter, until by chemical combustive reactions with the oxygen of the air, the only solid residue is the non-combustible ash, which is a very small fractional part of the original solids entering the basket.

The steam, vapor and gases of combustion will be withdrawn through the vent 43 and discharge tube 44. The inlet of vent 43, which is finely screened and is at a high level will not receive an appreciable amount of solid matter from the basket. This solid matter, when its particles become light enough that the suction force in the tube 44 overcomes the centrifugal force acting upon them, is drawn into the discharge tube which, being screened at its inlet, will permit the passage of only such solid matter as has been very completely burned and divided into small dust-like particles. Through the two outlets will be withdrawn all of the waste matter in its converted form and blown into the atmosphere.

It is apparent that other agencies than electricity may be employed for supplying the heat of the vaporization and incineration. Many other modifications may be made without departing from the principles or scope of the invention as defined in the appended claims. Similarly, the cycle of operation of the apparatus may be modified to suit varying conditions. Thus with stationary installations or on house trailers, the master control wheel may be designed to start the rotation of the basket, the flow of heat energy, and the action of the blower. Under some circumstances the same cycle may be suitable for aircraft. In aircraft installations, also it may be desirable to have the control of the basket rotation or of the heat supply or of the blower under the master control wheel, or of any two of these, rather than have them manually placed in standby operation by the pilot during flight periods.

In the case of retractable toilets in house trailers or installations in stationary buildings in which it is impracticable to maintain a standby heating of the incinerator, the heat may be turned on by a switch automatically operated when the toilet is swung from its concealed position. This automatic operation may also be brought about by the weight of the body on the toilet seat, especially if the toilet is not of the disappearing type. Thus the incineration is completed earlier. The rotation of the basket and operation of the motor may be caused to begin at the time the incinerator receives the waste matter.

I claim:

1. A waste disposal apparatus comprising in combination: a toilet bowl; a container communicating with the toilet bowl through a conduit; heater elements stationarily mounted in the container; a rotatable basket having perforated side walls positioned in the container to receive excreta from the conduit, said heater elements being disposed adjacent the outside walls of the basket whereby rotation of the basket urges excreta against the side walls where it is comminuted through said perforations and reduced to vapor and ash by the heater elements; and an exhaust pipe communicating with the basket adapted to suck out substantially all of said vapor and ash.

2. A waste disposal apparatus comprising an excreta receiving toilet bowl; a stationary container below the toilet bowl; a conduit leading from the lower end of the bowl into the upper end of the container; an open topped basket mounted for rotation within the container and adapted to receive excreta from the conduit, said basket having perforated side walls whereby rotation of the basket about its central axis will urge any excreta against the side walls by centrifugal force; a stationary heater disposed to heat the container and basket to a temperature to vaporize the water content of the excreta and reduce the solids of the excreta to ash; a stationary member disposed adjacent the side wall of the basket for comminuting the excreta material urged against the basket side walls when the basket is rotating; and a discharge pipe communicating with the container for withdrawing substantially all of said vaporized water and ash by pneumatic suction.

3. An apparatus according to claim 2 in which the toilet bowl is adapted to be swung into a walled compartment when not in use, said conduit from the toilet bowl to the container being flexible to accommodate such swinging; a normally closed valve in the conduit; and automatic means operable upon swinging the bowl into the compartment for opening the valve to permit any excreta to pass into the container.

4. An apparatus according to claim 2 in which said basket includes a plurality of upstanding radially directed fins having serrated upper edges, the fins being mounted on the floor of the basket to aid in comminuting of excreta received in the basket upon rotation of the basket.

5. An apparatus according to claim 2, including an additional vent pipe communicating with said basket and said discharge pipe.

6. A waste disposal apparatus comprising in combination: a retractable excreta receiving toilet bowl; a lower container communicating with the toilet bowl through a first conduit; an upper flush tank communicating with the toilet bowl through a second conduit; a first valve in the first conduit and a second valve in the second conduit; a basket in the container adapted to receive excreta when said first valve is opened, the basket being rotatable to urge excreta therein against its side walls; a stationary comminuting member adjacent the side walls; a stationary heater for raising the temperature of the container and basket to a value sufficient to reduce any excreta in the basket to vapor and ash; an exhaust pipe communicating with the basket; means for creating a suction in the pipe for removing substantialy all of said vapor and ash; and a control system for automatically opening said first and second valves when said toilet bowl is retracted.

References Cited in the file of this patent

UNITED STATES PATENTS

| Number | Name | Date |
|---|---|---|
| 1,272,483 | McGary et al. | July 16, 1918 |
| 1,293,141 | McGary | Feb. 4, 1919 |
| 2,076,950 | Koch | Apr. 13, 1937 |
| 2,279,577 | Martin | Apr. 14, 1942 |
| 2,279,578 | Martin | Apr. 14, 1942 |